(12) United States Patent
Ferreira et al.

(10) Patent No.: US 12,436,990 B2
(45) Date of Patent: Oct. 7, 2025

(54) DATA COMMUNICATIONS BETWEEN PARTIES

(71) Applicant: Palantir Technologies Inc., Palo Alto, CA (US)

(72) Inventors: Francisco Ferreira, Zurich (CH); Ryan Norris, Tokyo (JP); Viktor Nordling, Watson (AU); Kelvin Lau, Kew (AU)

(73) Assignee: Palantir Technologies Inc., Denver, CO (US)

( * ) Notice: Subject to any disclaimer, the term of this patent is extended or adjusted under 35 U.S.C. 154(b) by 539 days.

(21) Appl. No.: 17/010,187

(22) Filed: Sep. 2, 2020

(65) Prior Publication Data

US 2021/0064645 A1    Mar. 4, 2021

(30) Foreign Application Priority Data

Sep. 2, 2019 (GB) .................................... 1912591

(51) Int. Cl.
*G06F 16/36* (2019.01)
*G06F 16/176* (2019.01)
*G06F 16/182* (2019.01)

(52) U.S. Cl.
CPC .......... *G06F 16/367* (2019.01); *G06F 16/176* (2019.01); *G06F 16/182* (2019.01)

(58) Field of Classification Search
CPC ....... G06F 16/36; G06F 16/367; G06F 16/176
See application file for complete search history.

(56) References Cited

U.S. PATENT DOCUMENTS

| 9,760,606 | B1 * | 9/2017 | Wilczynski | G06F 16/2457 |
|---|---|---|---|---|
| 10,803,106 | B1 * | 10/2020 | Beard | G06F 16/367 |
| 10,938,817 | B2 * | 3/2021 | Han | G06F 16/9024 |
| 2008/0307523 | A1 * | 12/2008 | Subramanyam | G06F 16/36 |
| | | | | 707/999.002 |

(Continued)

FOREIGN PATENT DOCUMENTS

EP    3321825 A1    5/2018

OTHER PUBLICATIONS

Extended European Search Report for EP Application 20194085.5 dated Feb. 11, 2021, 6 pages.

(Continued)

*Primary Examiner* — Pierre Vital
*Assistant Examiner* — Jedidiah P Ferrer
(74) *Attorney, Agent, or Firm* — Sheppard Mullin Richter & Hampton LLP

(57) ABSTRACT

A method, performed by one or more processors, is disclosed, comprising providing, to a plurality of parties permitted to communicate data via a shared database, an ontology application associated with a common core ontology, the core ontology defining constraints required to be met for producing, from one or more received datasets, one or more data objects for storing in the shared database. The ontology application may be configured to receive one or more datasets from one or more parties and to use the core database ontology to determine if the received one or more datasets conform to the constraints of the core ontology, and store the received one or more datasets as data objects in the shared database, conditional on the constraints being met.

18 Claims, 6 Drawing Sheets

(56) References Cited

U.S. PATENT DOCUMENTS

| | | | | |
|---|---|---|---|---|
| 2010/0005386 | A1* | 1/2010 | Verma | G06F 16/36 |
| | | | | 715/237 |
| 2012/0173493 | A1* | 7/2012 | Sabbouh | G06F 16/367 |
| | | | | 707/687 |
| 2012/0239605 | A1* | 9/2012 | Hohimer | G06N 5/04 |
| | | | | 706/55 |
| 2012/0284259 | A1* | 11/2012 | Jehuda | G06F 16/3338 |
| | | | | 707/769 |
| 2014/0101203 | A1* | 4/2014 | Meunier | G06F 16/80 |
| | | | | 707/794 |
| 2016/0140789 | A1* | 5/2016 | Wickersham, III | G06Q 50/01 |
| | | | | 705/12 |
| 2017/0052974 | A1* | 2/2017 | Zackoski | G06F 16/1744 |
| 2017/0061001 | A1* | 3/2017 | Tonkin | G06F 16/3338 |
| 2019/0034491 | A1* | 1/2019 | Griffith | G06F 16/2379 |
| 2020/0097504 | A1* | 3/2020 | Sequeda | G06F 16/9024 |
| 2020/0312298 | A1* | 10/2020 | Bui | G06F 3/0482 |
| 2021/0232953 | A1* | 7/2021 | Hartley | G06F 16/367 |

OTHER PUBLICATIONS

Rahm et al., "Data Cleaning: Problems and Current Approaches", Quarterly Bulletin of the Computer Society of the IEEE Technical Committee on Data Engineering, The Committee, Washington, D.C., Dec. 1, 2000, pp. 1-11.

* cited by examiner

DATA COMMUNICATIONS BETWEEN PARTIES

CROSS-REFERENCE TO RELATED APPLICATION

This application claims priority to United Kingdom Application Number GB1912591.3, filed Sep. 2, 2019, the content of which is incorporated herein by reference in its entirety.

TECHNICAL FIELD

The present disclosure relates to systems and methods for data communications between parties. In example embodiments, the systems and methods use an application program that enforces a common ontology for datasets received from said parties for controlling propagation of the datasets to a database used by said parties for communicating the datasets.

BACKGROUND

Multiple parties, which may be distinct organizations or different users or groups of users of a common organization, may store and communicate datasets relating to their operations. Such datasets may be confidential within an organization and sometimes such datasets may be communicated with one or more other parties in the course of working on related projects. How to ensure one or more such datasets, or transformed versions of the datasets, are provided in a consistent and error-free way is important, for example to avoid downstream system crashes or errors based on the communicated datasets.

For example, a first party may detect software vulnerabilities and/or malicious events on a computer network and may store in a shared database such detections as events associated with the type of software and/or computers affected. Such events may be notified to a different party which applies such objects in one or more processes or transforms to determine where similarly vulnerable machines are in a larger network. Another transform may generate notifications or patches based on the event objects. That party may then automatically distribute notifications and/or patches to affected machines in the larger network to avoid propagation of the events on the larger network. If, however, the objects are provided to the database by the first party in such a way that the objects cannot be understood, or cannot be processed downstream, then the overall process may fail and machines on the larger network may remain vulnerable and unfixed. The same concept applies also to other types of data and network which uses a database to communicate data objects to different parties for performing downstream tasks such as data transformations or analysis.

SUMMARY

According to one aspect, there is provided a method, performed by one or more processors, comprising:
providing, to a plurality of parties permitted to communicate data via a shared database, an ontology application associated with a common core ontology, the core ontology defining constraints required to be met for producing, from one or more received datasets, one or more data objects for storing in the shared database, the ontology application being configured to:
receive one or more datasets from one or more parties;
use the core database ontology to:
determine if the received one or more datasets conform to the constraints of the core ontology; and
store the received one or more datasets as data objects in the shared database, conditional on the constraints being met.

The method may further comprise providing the core ontology to the plurality of parties.

The core ontology may further define one or more data verification tests for the one or more received datasets, wherein the ontology application is further configured to:
perform the one or more data verification tests on the one or more received datasets to identify erroneous data; and
generate and provide to said one or more parties an indication of any constraints not being met and/or erroneous data for the received one or more datasets.

The core database ontology may comprise a data definition language (DDL) defining the constraints and wherein the one or more data verification tests comprise one or more scripts encoded within the DDL which are run by the ontology application.

The one or more scripts may be run periodically by the ontology application according to a schedule.

The one or more data verification tests may comprise one or more data health checks to determine, for a received dataset comprising rows and columns of data items, a number of data items in the rows and/or columns determined as unhealthy based on health check criteria in the core ontology, the indication of the erroneous data being based on the number of unhealthy data items in one or more rows and/or columns.

The indication of erroneous data may be based on the proportion of the number of unhealthy data items in the one or more rows and/or columns to the total number of data items in the corresponding row and/or column.

The health check criteria may be based on the number of nulls and/or an incorrect format of data items in the received one or more rows and/or columns.

The ontology application may be configured to prevent creation and/or storage of at least some of the data objects or the received one or more datasets in the shared database if the number or the proportion of unhealthy data items in a row or column exceeds a predetermined threshold.

The ontology application may be configured only to treat raw datasets as acceptable input to the database ontology.

The ontology application may be configured, responsive to detecting one or more constraints not being met, to run one or more fixing algorithms automatically to fix non-compliant data items of the dataset, and to fix at least one non-complying data item in the non-complying dataset so that it complies with the core database ontology.

The method may further comprise receiving a request from a party to extend the core ontology by means of adding one or more specified data objects and/or data object fields, validating the request based on a number of prior uses of the data objects and/or data object fields in the request, and responsive to a positive validation, updating the core ontology.

Validating may be based on the number of prior uses of the data objects and/or data object fields in the request from a plurality of different party types.

Positive validation may require determined use by a plurality of data consumer parties and a plurality data producer parties.

The ontology application may be further configured to prevent non-compliant data from being propagated to one or more further dataset transformations.

The ontology application may be further configured to permit user-definition of a customized ontology and to permit data complying with the core ontology to be applied to the customized ontology, which customized ontology defines constraints for one or more data objects not in the core ontology.

The core ontology and ontology application may be provided to a plurality of parties of the shared database in a single file.

The method may be performed at a processing terminal which uses an ontology application and an associated core ontology for producing a plurality of data objects for communicating with one or more other parties via a shared database, the core ontology defining constraints required to be met for producing, from one or more received datasets, one or more data objects for storing in the shared database, the method comprising receiving one or more datasets for sending to a shared database;

determining if the received one or more datasets conform to the constraints of the core ontology; and storing the received one or more datasets as data objects in the shared database, conditional on the constraints being met.

According to another aspect, there may be provided a computer program, optionally stored on a non-transitory computer readable medium, which, when executed by one or more processors of a data processing apparatus cause the data processing apparatus to carry out a method comprising:

providing, to a plurality of parties permitted to communicate data via a shared database, an ontology application associated with a common core ontology, the core ontology defining constraints required to be met for producing, from one or more received datasets, one or more data objects for storing in the shared database, the ontology application being configured to:

receive one or more datasets from one or more parties;
use the core database ontology to:
determine if the received one or more datasets conform to the constraints of the core ontology; and
store the received one or more datasets as data objects in the shared database, conditional on the constraints being met.

According to another aspect, there may be provided an apparatus configured to carry out a method comprising:

providing, to a plurality of parties permitted to communicate data via a shared database, an ontology application associated with a common core ontology, the core ontology defining constraints required to be met for producing, from one or more received datasets, one or more data objects for storing in the shared database, the ontology application being configured to:

receive one or more datasets from one or more parties;
use the core database ontology to:
determine if the received one or more datasets conform to the constraints of the core ontology; and
store the received one or more datasets as data objects in the shared database, conditional on the constraints being met, the apparatus comprising one or more processors.

BRIEF DESCRIPTION OF THE DRAWINGS

The features of the subject innovations are set forth in the appended claims. However, for purpose of explanation, several aspects of the disclosed subject matter are set forth in the following figures:

DETAILED DESCRIPTION

Figure 1:
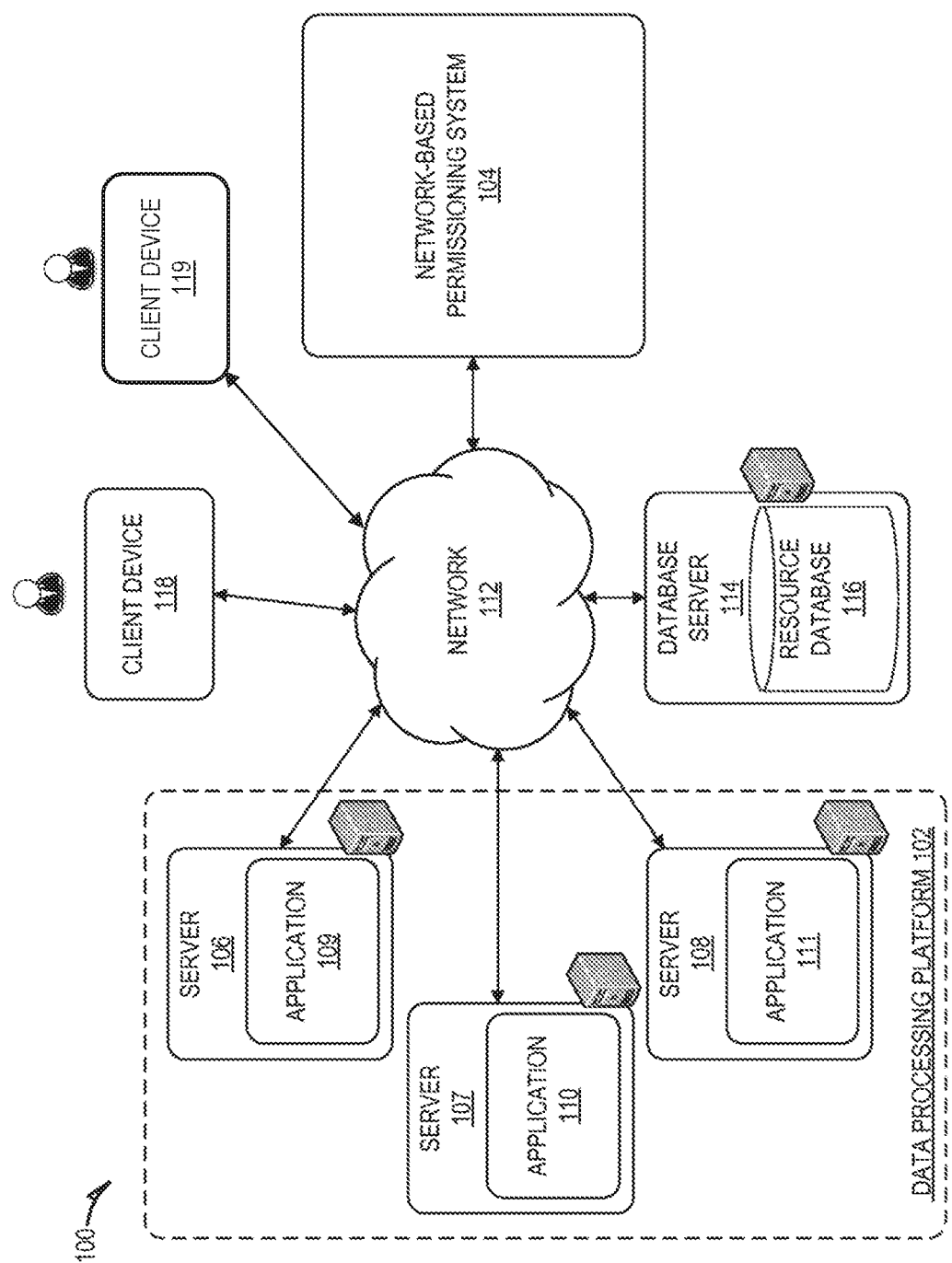
FIG. 1 is a block diagram illustrating a network system comprising a group of application servers of a data processing platform according to some embodiments of this specification.

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Example embodiments generally relate to data communications among multiple parties which communicate data objects stored in a shared database. For example, data objects may represent real-world objects such as machines, computers, software modules, software vulnerabilities, software patches, vehicles or craft (e.g. ships or aircraft), components thereof, sub-components such as individual physical parts and/or situational or engineering data associated with such real-world objects. A shared database is a database that stores data objects for use by multiple parties, with restrictions being employed to determine how particular parties can access their own data objects and/or those of other parties. This may be means of an access control system (ACS) which may be provided by a local or an external system.

A party may be some entity with a distinct individual identifier to a computer system or computer network. A party may be an organization or company, a user or group of users of that organization or company, or an automated user such as a machine or a sensor that generates and/or ingests data based on sensed or measured input. A party may also, in some example embodiments, be one, or a collection of, data transformations. A party may be identified by means of a user identifier (user ID) that may be accompanied by a password, token or some other verification means to identify the party to an ACS to determine whether or not the party may perform database actions on stored data objects and/or applications. A party may be a client terminal or a server.

The shared database may be part of a distributed set of storage nodes, interconnected by a network, wherein some parties use one storage node and other parties use a different storage node. The shared database may comprise one or more storage nodes whereby functionality such as indexing, load balancing and transaction handling may be managed by a database management system (DMS). The DMS may be a relational DMS or a graph-based DMS. A single DMS may be associated with multiple different storage nodes, but may treat them as a single database.

Example embodiments involve one or more of the creation, provision and use of a so-called core ontology for ensuring consistency on data objects in a database to permit downstream communications and transforms. In this context, multiple parties may store datasets relating to their own operations. Such datasets may be confidential and sometimes such datasets may be shared with one or more other parties in the course of working on a common or related project. How to communicate one or more such datasets, or transformed versions of the one or more such datasets, should be done in a consistent and error-free way to avoid downstream errors based on the communicated datasets and/or locking up computer systems which are configured to operate on such datasets.

As used herein, an ontology is a machine interpretable model defining in a formalized way one or more data objects, and for each data object, an object type and one or more object properties. It may also define relationships between data objects.

A data object is a data structure representing an entity, which can be any entity such as a machine, computer, software module, software vulnerability, software patch, vehicle or craft (e.g. ship or aircraft), components thereof and/or situational or engineering data associated with such real-world objects, to give some examples. A data object may be defined in a table, e.g. as a row in a table, and, in some cases, one or more keys may be provided in a row to link to one or more other tables to define a particular data object.

A dataset is a set of data received from a party which may relate to a data object or to a plurality of data objects. In order to be stored in the database as one or more data objects, the dataset needs to conform to the core ontology, or at least be automatically fixable so that it can conform to the core ontology. Datasets may be generated by one or more of humans, machines and sensors, such as by one or more computers or measurement equipment. Datasets may comprise a stream of real-time data, non-real-time data, a discrete file or multiple files. The datasets may relate to tables of data comprising rows and columns, but may be provided in any suitable form. Data items in a dataset may comprise values corresponding to the rows and columns or keys to other datasets.

By way of example, in the context of transportation, the core ontology may define a data object of a "ship" type, having properties such as one or more of "date of entering service", "owner", "operator", "engines", "routes", components thereof, sub-components such as individual physical parts and/or situational or engineering data associated with such data object and so on. One or more of those properties may be constrained to one of a predetermined subset of expected values. One or more of those properties may be constrained to particular units of measurement or a particular number of digits, characters and/or decimal places. Such constraints may be defined by the core ontology. A value may be provided in received datasets for the ship object and for one or more of the properties. The values may be stored in the database as data items. Some values may be null values, i.e. there is no data item, because that data may not currently be available. The core ontology may also define relationships between the ship object and other objects, such a "ship fleet" object, or an "operator" object, e.g. to permit all ships assigned to the operator to be determined. For example, the value of the "operator" field may have a relationship to another data object defining the operator, i.e. a company having properties such as a locations, engineering capabilities, contact details and number of employees. The relationship may be "operated by".

Definitions of properties and relationships may comprise metadata within the ontology and/or associated with one or more fields which may be provided by columns in a table. In some embodiments, the ontology is defined using a schema, which may use a schema data definition language (DDL) such as XML or equivalent.

Embodiments herein provide a core ontology which may be enforced by an ontology application to control whether or not data objects are stored in a shared database.

The core ontology is one that defines, for example using a DDL, a restricted set of core data objects for which ingested data should conform to as a requirement to be stored to the shared database and/or propagated to one or more downstream transforms and/or to other ontologies.

In some embodiments, the core ontology may be expanded based on requests from one or more of the parties. In some embodiments, the core ontology is configured only to accept raw datasets, that is datasets generated by one or more parties and not derived from some other ontology, although some pre-processing such as cleaning may be performed to suit the data to the core ontology. As part of the formal definition of the core ontology, one or more constraints may be defined. These constraints may be provided to the parties in documentary or machine-readable form.

A constraint is a formal requirement of one or more properties or fields of a data object defined by the core ontology. Constraints may be tested by the ontology application by way of an assertion; either the constraint is met or it is not. This is to ensure that ingested datasets not conforming to the core ontology do not propagate incorrect data to the database and/or to downstream processes. The formal requirements may, for example, specify the format of particular values in a field or column, what units of measurement are used, how many decimal places are used, whether or not nulls are permitted, and so on.

Embodiments may also provide one or more data verification tests as an integral part of the core ontology. Verification tests are not constraints but rather tests to assess the health of data items corresponding to the objects. Whereas failure to conform with constraints may prevent datasets being propagated to the database or to downstream transforms, a certain type or amount of so-called unhealthy data may be tolerated and may not prevent such propagation. A typical result of detecting a certain type or amount of unhealthy data is to issue a warning to a graphical user interface (GUI) of a party's computer terminal. This may be triggered responsive to a particular predetermined condition. In some embodiments, if a warning is not acted on or acknowledged after a predetermined time frame, propagation of datasets comprising the unhealthy data may be prevented, as if in non-conformance.

The ontology application is a computer application associated with the core ontology. The ontology application may be a web-based application or a stand-alone application which is downloaded by one or more client terminals of the different parties. The ontology application may ingest the one or more datasets from the one or more parties and may check the ingested datasets against the core ontology to determine conformance with the constraints and may also perform the one or more data verification tests. The ontology application may also generate and provide to said one or more parties an indication of constraints not being met and/or erroneous data for the received one or more datasets. The ontology application may also generate control signals or data messages for halting downstream processes, including, for example, pausing a computer or machine configured to be acting on data derived from the data objects to which the ingested datasets relate.

As mentioned, the core ontology may comprise a DDL schema defining the constraints. The DDL may also comprise the data verification tests as one or more scripts encoded within the schema which are run by the ontology application. Thus, the core ontology may be considered a monolithic data resource comprising all code required to be enforced by parties using the shared database. The core ontology may be provided as single, exportable file, that is maintained consistent and periodically updated (versioned) by a provider of the core ontology. The one or more verification test scripts may be run periodically by the ontology application according to a schedule defined by the scripts. Different verification test scripts may be run to different schedules. The one or more data verification tests may comprise one or more data health checks to determine, for a received dataset comprising rows and columns of data items, the number of data items in the rows and/or columns determined as unhealthy. The indication of the erroneous data may based on the number of unhealthy data items in one or more rows and/or columns. The indication of erroneous data may be based on the proportion of unhealthy data items in the one or more rows and/or columns to the total number of data items in the corresponding row and/or column. For example, the health check criteria may be based on the number of nulls and/or an incorrect format of data items in the received one or more rows and/or columns. The ontology application may be configured to prevent creation and/or storage of at least some of the data objects in the shared database if the number or proportion of unhealthy data items in a row or column exceeds a predetermined threshold.

In this respect, there may be a tolerable number of nulls or data items having incorrect formatting. In practical terms, some unhealthy data is to be expected when ingesting huge datasets. However, a large number of nulls, for example, may be indicative of fundamental problems as to how the dataset is being generated. For example, a sensor may be in error, or a measurement device may have gone offline. Whilst it is useful to receive an indication of such unhealthy data, it may be better to halt storage and propagation of such unhealthy data. Otherwise, this may cause downstream errors and/or require time-consuming remedial action.

In some embodiments, the ontology application may be configured, responsive to detecting one or more ontology constraints not being met, to run one or more fixing algorithms automatically to fix non-compliant data items of the dataset. This may be as straightforward as converting incorrect measurement units or adding digits or characters.

In some embodiments, the ontology application may be configured, responsive to detecting one or more restraints not being met, to generate a displayable indication of the non-compliance, together with one or more suggested remedial actions that the user is prompted to select. Upon selection, the suggested remedial action may be performed.

The following description provides an example of how example embodiments may be employed in an example network system.

FIG. 1 is a network diagram depicting a network system 100 comprising a data processing platform 102 in communication with a network-based permissioning system 104 (for example, a form of ACS) configured for evaluating access permissions for data resources to which the group of application servers 106-108 share common access according to some embodiments. Client devices 118, 119 are also shown connected to the network 112 and may be associated with one or more users or groups of users, i.e. different parties. In certain embodiments, the network system 100 may employ a client-server architecture, though is not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

In certain examples, the data processing platform 102 includes a group of servers—specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyze data to develop various insights about the data, and visualize various metrics associated with the data. To further this example, the network application 109 may be used to analyze data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers, and in certain embodiments, fewer or additional servers and applications may be included.

According to some examples, each of the servers 106-108 are in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a database server 114. The resource database 116 stores data resources that may be used by any one of the applications 109-111 hosted by the data processing platform 102.

In some examples, within an established login or access session, to access data resources from the resource database 116, the servers 106-108 transmit access requests via the network 112 to the network-based permissioning system 104. For example, an access request includes a data resource identifier and a user identifier corresponding to a user (also referred to herein as, e.g., a "requesting user") who may be utilizing one of the applications 109-111 to access to the data resource (also referred to herein as, e.g., a "requesting application"). As an example, the network-based permissioning system 104 may include an application programming interface (API) or other machine interface to receive such access requests from the server 106-108 hosting the requesting application 109-111.

In certain examples, upon receiving an access request for a particular data resource, the network-based permissioning system 104 accesses a separately stored policy object associated with the particular data resource. Policy objects are stored in a database of the network-based permissioning system 104, which is maintained independently of the resource database 116.

According to some examples, a policy object includes a data structure that includes an identifier (e.g., a globally unique resource identifier) of the data resource to which it is associated, one or more identifiers of a parent data resource from which the data resource depends (referred to as a "parent identifier"), and/or policy information that includes dependent resource identifiers. The policy information may also include one or more statements that specify operations the user is or is not authorized to perform with respect to the data resource based on satisfaction of one or more conditions. Authorized operations may be globally applicable to the network system 100, or may be specific to any one of the network applications 109-111.

According to certain examples, the network-based permissioning system 104 uses the policy information in the corresponding policy object to determine the user's access permissions with respect to the data resource. Once the network-based permissioning system 104 determines the user's access permission with respect to the data resource, the network-based permissioning system 104 communicates a response to the access request to the requesting application. More specifically, the network-based permissioning system 104 communicates one or more data packets (e.g., computer-readable information) to the server hosting the requesting application as a response to the access request. The response to the access request may include the identified requesting user's access permissions with respect to the data resource. The requesting user's access permissions may include one or more authorized operations that the user may perform on the data resource.

According to some examples, the network-based permissioning system 104 serves as a centralized permissioning system for the data processing platform 102 to evaluate access permissions of users of the network system 100 with respect to data resource stored in the resource database 116. In this way, the network-based permissioning system 104 obviates the need for the network applications 109-111 to have distinct dedicated permissioning systems. As a result, the network applications 109-111 can operate and function independently from one another while maintaining consistency with respect to user's access permissions of shared data resources.

In some examples, as shown, the network system 100 also includes one or more client devices 118, 119 in communication with the data processing platform 102 and the network-based permissioning system 104 over the network 106. The client devices 118, 119 communicate and exchange data with the data processing platform 102

In certain examples, the client devices 118, 119 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client devices 118, 119 and the data processing platform 102 involve user-selected functions available through one or more user interfaces (UIs). The UIs may be specifically associated with a web client (e.g., a browser) or an application 109-111 executing on the client devices 118, 119 that is in communication with the data processing platform 102. For example, the network-based permissioning system 104 provides user interfaces to respective users or parties associated with the client device 118, 119 (e.g., by communicating a set of computer-readable instructions to the client devices 118, 119 that cause the respective client device to display the user interfaces) that allow the user to register policies associated with data resources stored in the resource database 116.

Figure 2:
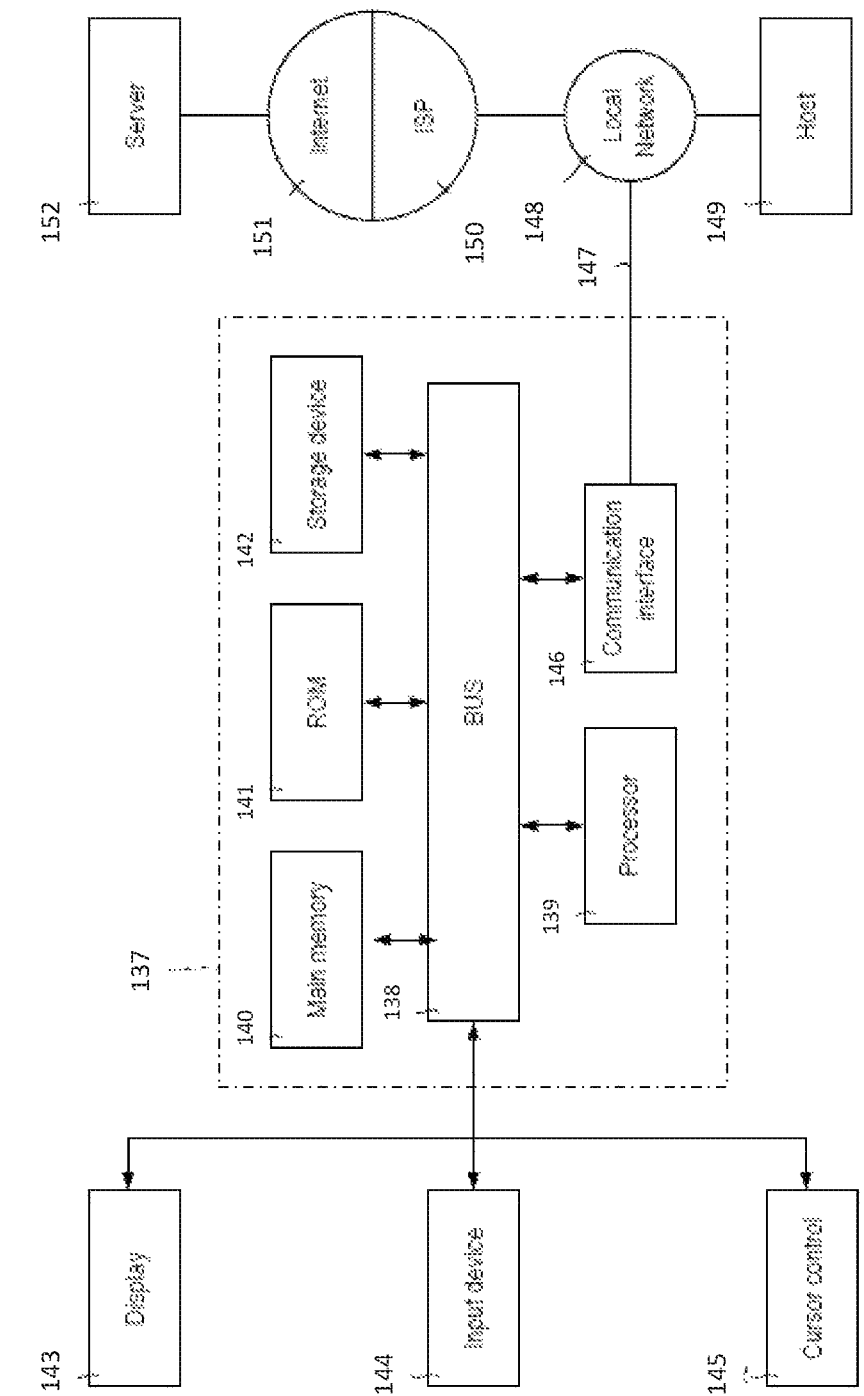
FIG. 2 is a block diagram of a computer system according to embodiments of this specification.

FIG. 2 is a block diagram of a computer system 137 according to certain embodiments, which may comprise the data processing platform 102, one or more of the servers 106-108, the database server 114, and/or the network-based permissioning system 104.

According to certain examples, the computer system 137 includes a bus 138 or other communication mechanism for communicating information, and a hardware processor 139 coupled with the bus 138 for processing information. The hardware processor 139 can be, for example, a general purpose microprocessor. The hardware processor 139 comprises electrical circuitry.

In some examples, the computer system 137 includes a main memory 140, such as a random access memory (RAM) or other dynamic storage device, which is coupled to the bus 138 for storing information and instructions to be executed by the processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

In certain examples, the computer system 137 further includes a read only memory (ROM) 141 or other static storage device coupled to the bus 138 for storing static information and instructions for the processor 139. A storage device 142, such as a magnetic disk or optical disk, is provided and coupled to the bus 138 for storing information and instructions.

According to some examples, the computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is a cursor control 145, for example, using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

According to certain examples, the computer system 137 can implement the techniques described herein using customized hard-wired logic, one or more ASICs or FPGAs, firmware and/or program logic which in combination with the computer system causes or programs the computer system 137 to be a special-purpose machine.

According to some embodiments, the operations, functionalities, and techniques disclosed herein are performed by the computer system 137 in response to the processor 139 executing one or more sequences of one or more instructions contained in the main memory 140. Such instructions can be read into the main memory 40 from another storage medium, such as the storage device 142. Execution of the sequences of instructions contained in the main memory 140 causes the processor 139 to perform the process steps described herein. In certain embodiments, hard-wired circuitry can be used in place of or in combination with software instructions.

For example, the term "storage media" as used herein refers to any non-transitory media that stores data and/or instructions that cause a machine to operate in a specific fashion. In some examples, such storage media can comprise non-volatile media and/or volatile media. Non-volatile media includes, for example, optical or magnetic disks, such as storage device 142. In an example, volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

In some examples, storage media is distinct from, but can be used in conjunction with, transmission media. Transmission media participates in transferring information between storage media. For example, transmission media includes coaxial cables, copper wire and fibre optics, including the wires that comprise the bus 138. Transmission media can also take the form of acoustic or light waves, such as those generated during radio-wave and infra-red data communications.

In certain examples, various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to the computer system 137 can receive the data on the telephone line or other transmission medium and use an infra-red transmitter to convert the data to an infra-red signal. An infra-red detector can receive the data carried in the infra-red signal and appropriate circuitry can place the data on the bus 138. The bus 138 carries the data to the main memory 140, from which the processor 139 retrieves and executes the instructions. The instructions received by the main memory 140 can optionally be stored on the storage device 142 either before or after execution by the processor 139.

According to some examples, the computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

According to certain examples, the network link 147 provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network commonly referred to, e.g., as the "Internet" 151. The local network 148 and the Internet 151 both use electrical, electromagnetic or optical signals that carry digital data streams. The signals through the various networks and the signals on the network link 147 and through the communication interface 146, which carry the digital data to and from the computer system 137, are example forms of transmission media.

In some examples, the computer system 137 can send messages and receive data, including program code, through the network(s), network link 147 and communication interface 146. For example, a first application server 106 may transmit data through the local network 148 to a different application server 107, 108.

Figures 3, 4:
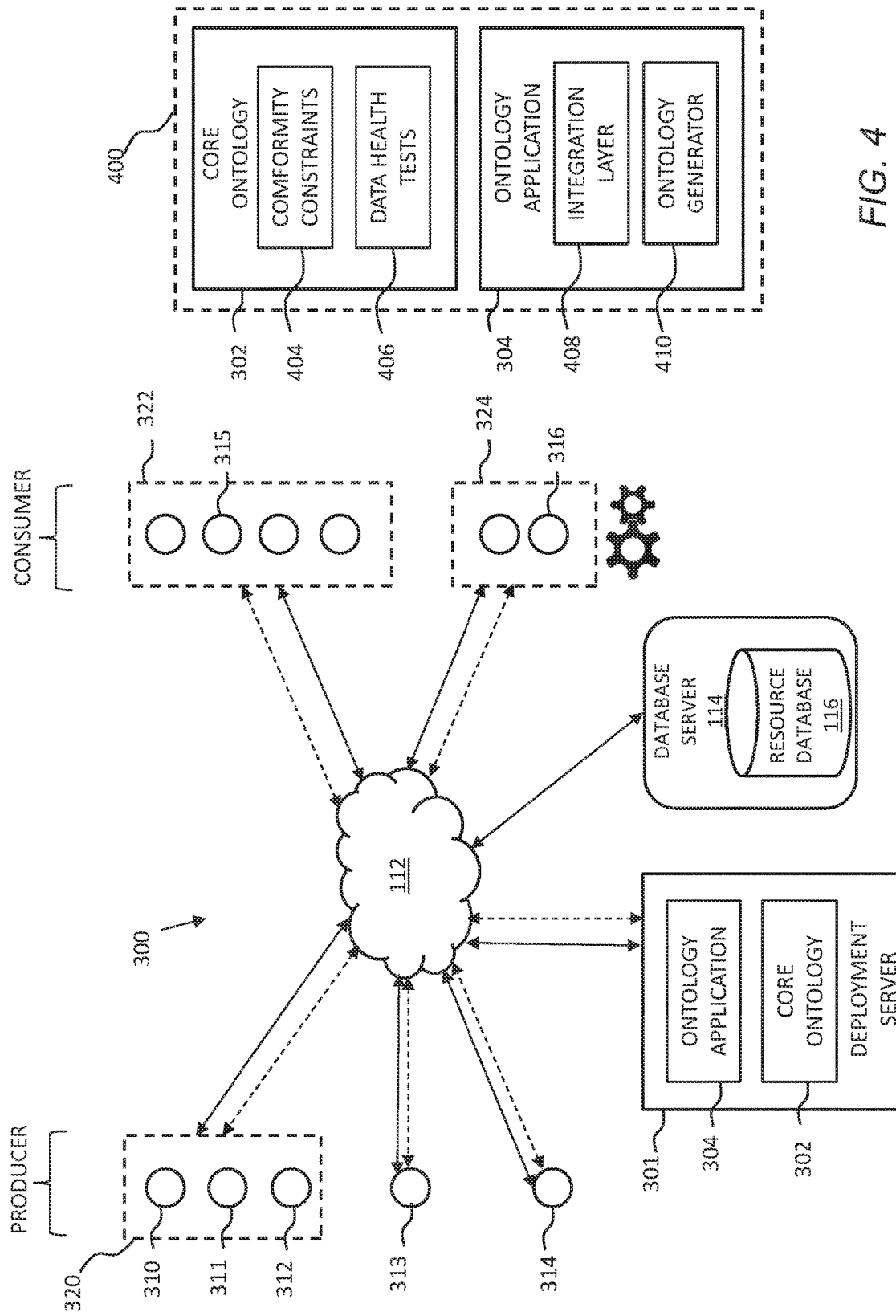
FIG. 3 is a schematic diagram of a network system, that may be part of the FIG. 1 network system, including a deployment server according to embodiments of this specification.
FIG. 4 is a schematic diagram of a file comprising a core ontology and an ontology application according to embodiments of this specification.

FIG. 3 is a block diagram of a computer network 300 based on the FIG. 1 network according to certain embodiments. The computer network 300 may, for example, comprise the communications network 112, database server 114 and resource database 116 as shown in FIG. 1. The computer network 300 may also comprise, on one or more computer processing nodes of the FIG. 1 computer network, which may comprise the data processing platform 102, one or more of the servers 106-108, the database server 114, and/or the network-based permissioning system 104. For example, one or more of the servers 106-108 may comprise a deployment server 301 which is a centralised server for maintaining versions of a core ontology 302 and an ontology application 304 which is associated with the core ontology. However, the core ontology 302 and ontology application 304 may be provided by different deployment servers in other embodiments. Alternatively, the database server 114 may provide, as additional functionality, the functions of the deployment server 301. The deployment server 301 may provide the core ontology 302 and the ontology application 304 in a single file, which may be a template file. Alternatively, separate files respectively comprising the core ontology 302 and the ontology application 304 may be provided. The core ontology 302 and the ontology application 304 may be deployed to a plurality of client terminals 310-316 each of which may be permitted access to the resource database 116 on the database server 114 in accordance with permissions stored in the network-based permissioning system 104.

Each client terminal 310-316 (hereafter "terminal" or "terminals") may comprise the components shown in FIG. 2. Each terminal 310-316 may be one of a computer, laptop, tablet computer and mobile telephone, to give some examples. One or more of the terminals may comprise a machine, such as a manufacturing machine or a process controller. Each terminal 310-316 may be associated with a particular party, for example a user or group of users. A respective company or organisation may comprise a party associated with the terminals 310-316.

For example, first to third terminals 310-312 may comprise part of a first organisation 320 having its own network of terminals. For example, a fourth terminal 313 may comprise a machine or sensor for generating datasets relating to real-world objects. For example, a fifth terminal 314 may be associated with a second, different organisation from the first organisation. The first to fifth terminals 310-314 may be associated with data producers in the context of a real-world application. For example, in transportation, a data producer may produce engineering or sensor data from ships or aircraft regarding performance characteristics and/or defects. For example, in computer maintenance, the fourth terminal may comprise a software security platform for detecting vulnerabilities on versions of software resources and the fifth terminal for providing reference data as to what software resource versions are present and active on computers of the computer network 300. The sixth terminal 315 may comprise part of a third organisation 322, different from the first and second organisations 320, 314. Other terminals may comprise part of the third organisation 322. The seventh terminal 316 may comprise part of a fourth organisation 324, different from the first to third organisations 320, 314, 322. Other terminals may comprise part of the fourth organisation 324. The fifth and sixth terminals 315, 316 may be associated with data consumers in the context of a real-world application. For example, in transportation, a data consumer may be an engineering company for monitoring and scheduling maintenance and critical checks on ships or aircraft. For example, in computer maintenance, a data consumer may be an organisation's administration server for being notified of software vulnerabilities from the database and for deploying patches.

Referring to FIG. 4, a schematic view of a file 400 received by each of the terminals 310-316, from the deployment server 301. The file 400 may be provided as a compressed file which is decompressed at each terminal 310-316 upon, or sometime after receipt. The file 400 may comprise the core ontology 302 and an ontology application 304 associated with the core ontology 302. In some embodiments, the core ontology 302 and the ontology application 304 may be received as separate files. In some embodiments, the ontology application 304 may be a web-based application whereby the terminals 310-316 access the ontology application 304 remotely.

The core ontology 302 may comprise code composed in a schema DDL such as XML to define both conformity constraints 404 and data health tests 406, i.e. verification checks. The ontology application 304 may comprise an integration layer 408 and an ontology generator 410.

In operation, when datasets need to be created or edited by a terminal 310-316 in the resource database 116, such requests must pass through the ontology application 304. Otherwise, they are not accepted by the DMS of the database server 114. The DMS that handles requests for storage to the resource database 116 therefore may only commit data objects to the database if the datasets are first checked by the ontology application 304.

The ontology application 304 tests data according to the core ontology 302. The core ontology 302 provides a unifying ontology for workflows, i.e. movements and transforms of data between parties, whether within organisations or across different organisations. The core ontology 302 acts as a source of truth that all parties, e.g. the terminals 310-316 and their users need to adhere to, in terms of creating or editing datasets. In this sense, creating may also mean ingesting datasets. In one sense, enforcing the use of the core ontology 302 establishes a form of communications protocol. For example, if a user using the sixth terminal 315 in the third organisation 322 want to access, and possibly use in a transformation one or more rows produced by the first terminal 310, then application of the core ontology 302 will ensure that requests, retrievals and transformations will be consistent and that the data objects will be in an expected form. Transformations may be pre-provided or encoded to receive data objects according to the core ontology 302. This prevents downstream crashes from occurring.

The core ontology 302 may define a limited set of objects from which other objects can be derived from. For example, the ontology application 304 may enable parties to generate their own local derived ontology or ontologies, which may take data objects that conform to the core ontology 302 and apply some other constraints or derive other relationships therefrom. For this reason, the ontology application 304 may be configured only to accept raw datasets and not datasets derived from other ontologies, although some pre-processing such as cleaning may be performed on the raw datasets initially. Derived ontologies do not sit inside the core ontology 302 but can be directly derived therefrom.

The conformity constraints 404 of the core ontology may define hard requirements. That is, they may comprise assertions that need to be met in order for a received dataset to be considered in conformance.

For example, for a data object of type "ship", properties of that ship object may comprise "ship identifier", "ship origin", "date of entering service", "owner", "operator", "engines" and "routes". For "ship identifier" the core ontology 302 may require values having a specific n-digit format. For "ship origin", the core ontology 302 may require a standardised two-character country code. For "date of entering service", the core ontology 302 may require values having the mm-dd-yyyy format. Other examples may be envisaged along the same or similar lines. The ontology application 304, upon receiving a dataset comprising a field corresponding to, for example, "date of entering service" in a format other than the mm-dd-yyyy format will fail the assertion and the dataset may not be propagated to the resource database 116.

As another example, consider engineering or technical data. For a data object of type "engine" then a property of that engine may comprise "maximum torque." For "maximum torque" the core ontology 302 may require values in units of Newton metres (Nm) having a length of four to six digits. Other examples may be envisaged along the same or similar lines. The ontology application 304, upon receiving a dataset comprising a field corresponding to, for example, "maximum torque" in different units or not being four, five or six digits in length (e.g. if the dataset reflected 25 kNm rather than 25000 Nm) then the received dataset will fail the assertion and the dataset may not be propagated to the resource database 116.

In some embodiments, the ontology application 304 may however be configured to attempt prior to preventing propagation of the dataset. For example, taking the above example, one fix might to be automatically detect the presence of the "k" in the units and convert 25 to 25000 which then will meet the constraint imposed on that object property. Another example is by detecting, for the "ship origin" property, a data item of value "Britain". One might automatically identify this as corresponding to the standard two-character code of GB and fix it accordingly.

Failure of any assertion against the ontology constraints may produce an indication to be displayed at the terminal associated with the origin of the relevant dataset, e.g. the terminal itself or an administrator terminal associated therewith. This is at least to notify the provider of the dataset that action is needed to make the dataset conform and/or that the system or machine which is generating the datasets requires checking or maintenance. The indication may be by means of a graphical user interface (GUI) which may indicate the specific dataset in error, as well as why it is in error. If fixes have been performed automatically, these may be notified. If fixes are suggested, these may be indicated as suggested fixes in the GUI that require selection of an "ok" or similar function to proceed with the fix. Any additional information as may be useful to assist the user may also be presented on the GUI. For example, if a machine or computer is generating data in a non-compliant format, a prompt may be presented in the GUI that would enable all subsequently generated datasets to use a compliant format, and selection of an "ok" or similar function may automatically cause automatic conversion of the received datasets to the conforming format.

The data health tests 406 are used for a different purpose and may be applied each time datasets are ingested, or periodically on datasets stored in the resource database 116 by the associated party or terminal.

Data may considered unhealthy even if it conforms with the constraints imposed by the core ontology 302. For example, a received dataset may contain a number of nulls. For example, if no data item is generated or made available for "maximum torque" in a received dataset, this is considered a null. This may be considered a special case wherein the one or more constraints are not failed merely due to the data item being a null. The remainder of the dataset may still be propagated as one or more objects to the resource database 116, or to other transforms, assuming no other assertions are failed.

As another example, a received raw dataset whereby the number of characters or digits varies by a predetermined number may be considered unhealthy, e.g. some values have four digits and some have six digits. Again, whilst this may meet restraints of the relevant field, it may be indicative of unusual activity. The dataset may still be propagated as one or more objects to the resource database 116, or to other transforms, assuming no other assertions are failed.

Data health tests 406 may similarly comprise assertion tests or some other quality-based metric. For example, a data health test 406 may involve determining the number of nulls in a row or column. Another data health test 406 may involve determining a variation in characters or other formatting characteristics of the received data items. Indications as to the result of applying one or more data health tests 406 against received datasets may be provided by means of the graphical user interface (GUI). Similar to constraints, fixes may be attempted automatically or fixes may be suggested. If fixes are suggested, these may be indicated as suggested fixes in the GUI that require selection of an "ok" or similar function to proceed with the fix. Any additional information as may be useful to assist the user may also be presented on the GUI.

In some embodiments, one or more predetermined thresholds for the data health tests 406 may determine, for a received dataset comprising rows and columns of data items, a number of data items in the rows and/or columns determined as unhealthy based on the health check criteria, the indication of the erroneous data being based on the number of unhealthy data items in one or more rows and/or columns. For example, the GUI may indicate that M data items in an ingested row or column comprises N nulls, or M data items that vary by more than a predetermined amount from the majority of other data items.

In some embodiments, an indication of unhealthy data is based on the proportion of the number of unhealthy data items in the one or more rows and/or columns to the total number of data items in the corresponding row and/or column. This may be given as a percentage or ratio. For example, the indication may state that 32% of data items in a given row or column are nulls.

In some embodiments, the ontology application 304 may be configured to prevent indication, creation and/or storage of at least some of the data objects or the received one or more datasets in the resource database 116 if the number or the proportion of unhealthy data items in a row or column exceeds a predetermined threshold. For example, if it is determined that greater than X data items in a given row or column contain nulls, or greater than 20% of data items in a given row or column contain nulls, then further propagation of the dataset may be halted. This is to detect and prevent unhealthy data indicative of a more general problem in the dataset, e.g. generated by a machine or industrial process, being propagated to downstream processes or other machines that are reliant on that data. The number or percentage may be user-configured and/or may depend on the data items in question.

Figure 5:
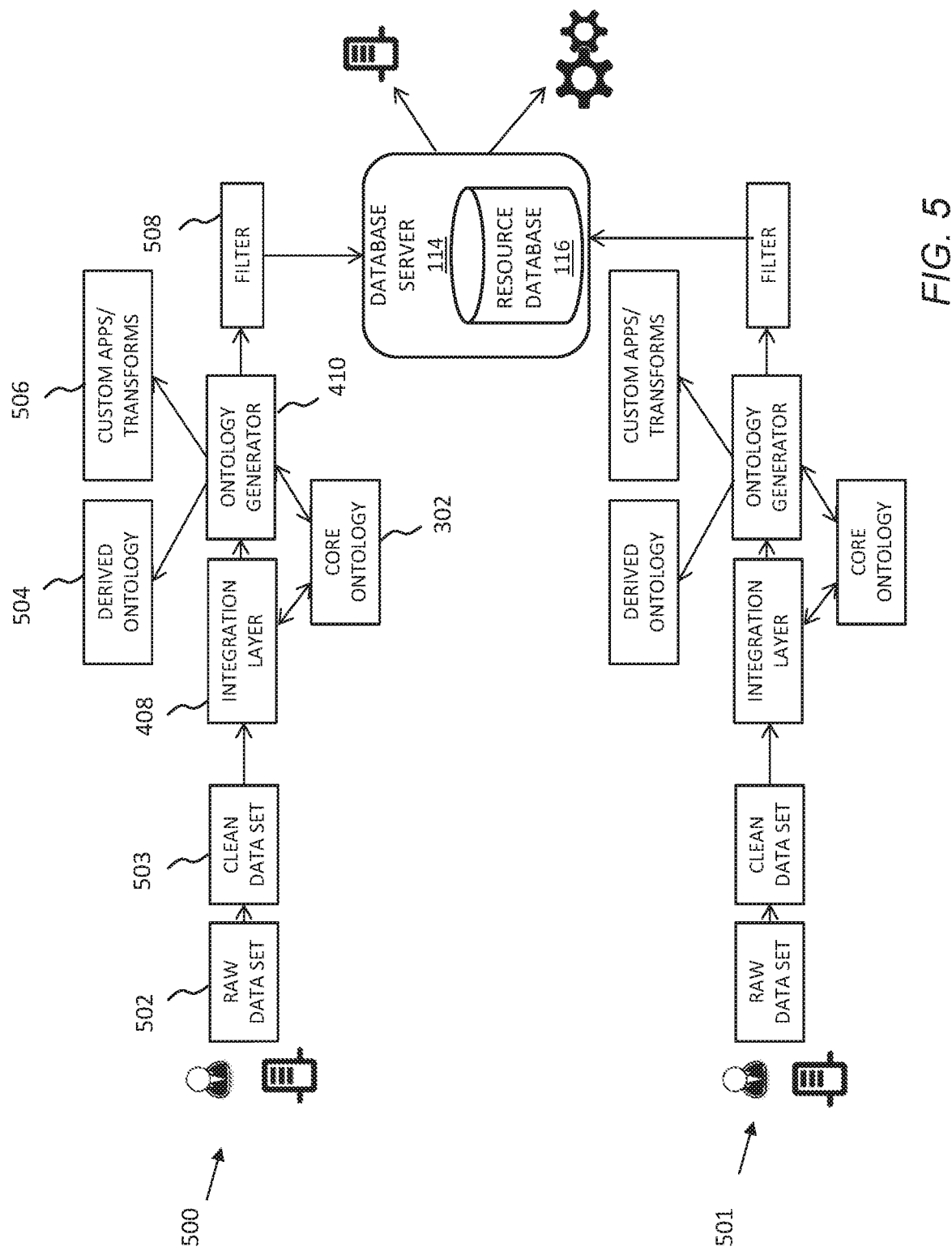
FIG. 5 is a schematic diagram of how elements of the FIG. 4 file may be used in operation to provide database functionality and communication between different parties according to embodiments of this specification.

FIG. 5 is a schematic block diagram showing the flow of datasets through the ontology application 304 and the application of the core ontology 302 as a way of ensuring consistency of data which enables it to provide a unified communications protocol between different parties. Two flows are actually represented, labelled as a first flow 500 and a second flow 501, respectively associated with different parties. The different parties may be part of the same group or organization or may be part of different groups or organizations. Each party stores data in the resource database 116. The following will focus on one flow 500 but it will be appreciated that corresponding operations may be performed by equivalent modules in the second follow 501.

A raw dataset 502 may be generated or otherwise provided by the first party and may then be cleaned to provide a clean dataset 503. Cleaning may comprise an initial process of error correction. The clean dataset 503 may be provided to an integration layer 408 of the ontology application 304.

The integration layer 408 is configured to create an object from the received dataset using the core ontology 302. For example, the integration layer 408 may receive a plurality of datasets from a particular folder and generates therefrom each object represented in the one or more datasets. For example, the datasets may derive from different data sources, e.g. different computers or machines, but can be unioned together to create a single object. The integration layer 408 may also perform fixes, such as renaming rows or columns where there are inconsistencies. The integration layer 408 may also provide enrichment of data where the core ontology 302 requires one or more fields, e.g. rows or columns.

Data objects created by the integration layer 408 may be provided to the ontology generator 410, which is configured to perform a number of functions. One function of the ontology generator 410 is to validate that the data objects comply with the constraints of the core ontology 302. Non-conformances are indicated to the relevant parties, as described above, and the data objects may be prevented from being propagated to the resource database 116. Similarly, health check tests may be performed, if scheduled, and an indication may be given of unhealthy data. Another function of the ontology generator 410 is to generate the final ontology objects that conform to the core ontology constraints and which can be stored in the resource database 116. This may additionally comprise generating basic ontology objects and wide ontology objects.

Basic ontology objects are objects for consumption by human users when performing analysis, whereas wide ontology objects are objects to be consumed electronically or programmatically. Basic ontology objects may be prepared differently than the wide ontology objects. For example, all nulls may be removed in basic ontology objects, but may remain in wide ontology objects. Another function of the ontology generator 410 may be to perform the fixes mentioned previously. Another function may be to add access controls to certain ontology objects based on, for example, permissions indicated in the data or in the core ontology 302.

In some embodiments, the integration layer 408 is an optional add-on.

The ontology generator 410 may also be used to build derived ontologies 504, or to link to a derived ontology created through some other means. A derived ontology 504 is an ontology derived from the core ontology 302 but which may contain other objects, i.e. one or more derived object types or properties not in the core ontology. Derived ontologies may be useful and meaningful for a specific party. Similarly, custom applications/transforms 506 may be built based on the core ontology 302. These may comprise applications or transforms downstream of the core ontology 302 and may tend to be specialized to the particular party that generated them. The output from the derived ontology 504 and the custom applications/transforms may not be provided to the resource database 116.

Figures 6, 7:
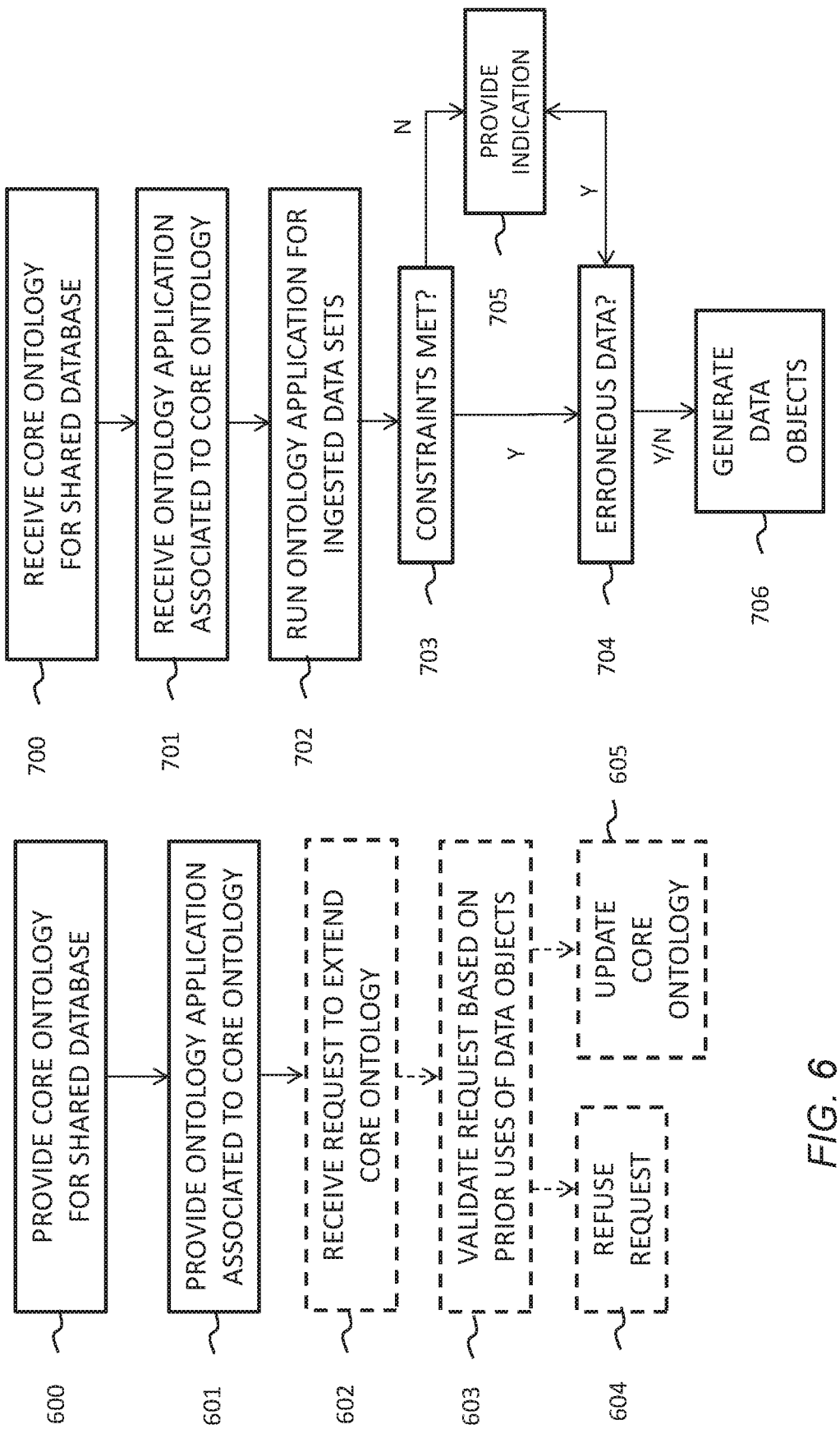
FIG. 6 is a flow diagram showing processing operations according to embodiments of this specification.
FIG. 7 is a flow diagram showing other processing operations according to embodiments of this specification.

FIG. 6 is a flow diagram showing processing operations that may be performed at the deployment server 301 shown in FIG. 3. The order of operations is not necessarily indicative of the order of processing. Additional and/or equivalent operations may be used.

A first operation 600 may comprise providing a core ontology for a shared database.

A second operation 601 may comprise providing an ontology application associated to the core ontology. The first and second operations 600, 601 may be performed at the same time or at different times.

A third operation 602, which is optional, may comprise receiving a request to extend the core ontology.

A fourth operation 603, which is also optional, may comprise validating the request received in the third operation 602 based on prior uses of data objects. In an example embodiment, the validation may be dependent on the extension, e.g. to add one or more objects and/or constraints to the ontology, meeting certain readability criteria, and also that objects and/or constraints to be added have been used or requested previously by at least two consumer parties and at least two producer entities.

A fifth operation 604 may comprise refusing the extension request if not validated in the fourth operation 603.

A sixth operation 605 may comprise updating the core ontology based on the extension request, if validated in the fourth operation 603.

FIG. 7 is a flow diagram showing processing operations that may be performed at one or more of the terminals 310-316 shown in FIG. 3. The order of operations is not necessarily indicative of the order of processing. Additional and/or equivalent operations may be used.

A first operation 700 may comprise receiving a core ontology for a shared database.

A second operation 701 may comprise receiving an ontology application associated to the core ontology. The first and second operations 700, 701 may be performed at the same time or at different times.

A third operation 702 may comprise running the ontology application for ingested datasets.

A fourth operation 703 may comprise determining if one or more constraints of the core ontology are met.

If met, a fifth operation 704 may comprise determining if there is or are any erroneous or unhealthy data.

In either of the fourth or fifth operations 703, 704, an indication of non-conformance or of unhealthy data may be provided to a GUI in a sixth operation 705.

A seventh operation 706 may comprise generating the data objects, which may be dependent on predetermined criteria associated with the erroneous data.

Figure 8:
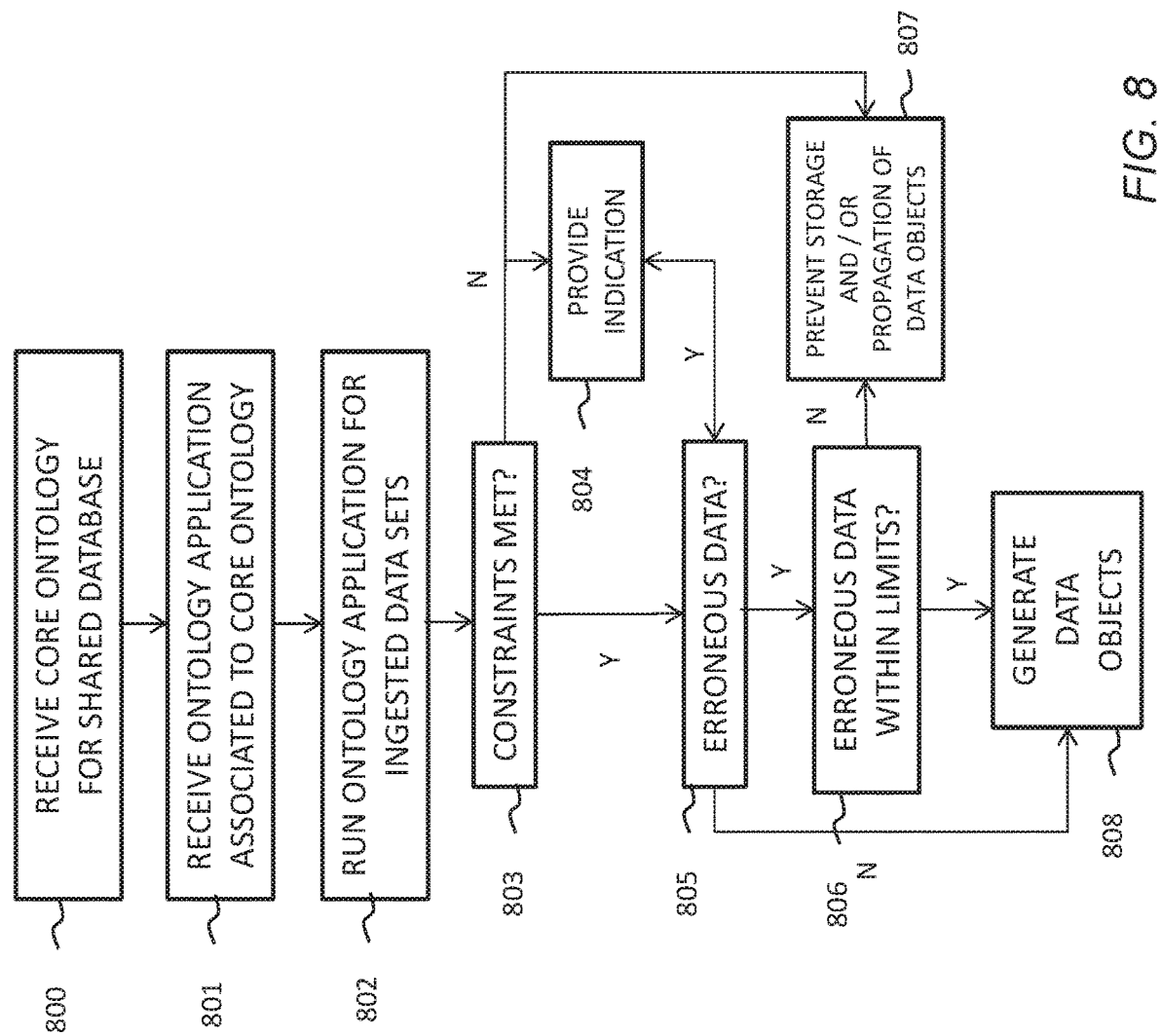
FIG. 8 is a flow diagram showing other processing operations according to embodiments of this specification.

FIG. 8 is a flow diagram showing processing operations that may be performed at one or more of the terminals 310-316 shown in FIG. 3. The order of operations is not necessarily indicative of the order of processing. Additional and/or equivalent operations may be used.

A first operation 800 may comprise receiving a core ontology for a shared database.

A second operation 801 may comprise receiving an ontology application associated to the core ontology. The first and second operations 800, 801 may be performed at the same time or at different times.

A third operation 802 may comprise running the ontology application for ingested datasets.

A fourth operation 803 may comprise determining if one or more constraints of the core ontology are met.

If met, a fifth operation 805 may comprise determining if there is any erroneous or unhealthy data.

If the fourth or fifth operations 803, 804 are not met, an indication of non-conformance or of unhealthy data may be provided to a GUI in a sixth operation 804 and data objects, in respect of the fourth operation 803 not being met, data objects may be prevented from being propagated onwards in an operation 807.

A seventh operation 806 may comprise determining whether the erroneous data is within a predetermined limit, e.g. a percentage of nulls being above a predetermined number. If so, the process may again move to operation 807.

An eighth operation 808 may comprise generating the data objects.

Extensions and Alternatives

It is understood that any specific order or hierarchy of steps in the methods disclosed are an illustration of example approaches. Based upon design preferences, it is understood that the specific order or hierarchy of steps in the methods may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

The invention claimed is:

1. A method, performed by one or more processors, comprising:

providing an ontology application associated with a core ontology, the core ontology defining one or more data validation tests comprising constraints required to be met for producing, from one or more received datasets, one or more data objects for storing in a shared database, wherein the constraints comprise access control permissions of the one or more data objects, the access control permissions comprising read or write permissions corresponding to the one or more data objects, the ontology application being configured to:

receive one or more datasets from one or more parties, wherein the one or more datasets represent one or more data objects;

receive an indication to expand the core ontology, wherein the expanding of the core ontology comprises adding a previously invalidated data object to the expanded core ontology, wherein the previously invalidated data object comprises a data structure generated from one or more datasets, wherein the expanding of the core ontology comprises:

deriving a new data validation test that validates the previously invalidated data object;

validate the indication to expand the core ontology based on a number of prior requests of the previously excluded data object or of a data field corresponding to the previously excluded data object exceeding a threshold number;

and in response to validating the request:

implement the new data validation test to:

determine if the received one or more datasets conform to the constraints of the expanded core ontology;

store the received one or more datasets as the one or more data objects in the shared database, conditional on the constraints being met; and in response to determining that a portion of the received one or more datasets are associated with one or more unmet constraints, electronically generate a signal that halts a downstream process acting on any data derived from the portion of the received one or more datasets or modifying a signal that initiates the downstream process.

2. The method of claim 1, further comprising providing the core ontology to the plurality of parties.

3. The method of claim 1, wherein the core ontology further defines one or more data verification tests for the one or more received datasets, wherein the ontology application is further configured to:

perform the one or more data verification tests on the one or more received datasets to identify erroneous data; and generate and provide to said one or more parties an indication of any constraints not being met and/or erroneous data for the received one or more datasets.

4. The method of claim 3, wherein the core ontology comprises a data definition language (DDL) defining the constraints and wherein the one or more data verification tests comprise one or more scripts encoded within the DDL which are run by the ontology application.

5. The method of claim 4, wherein the one or more scripts are run periodically by the ontology application according to a schedule.

6. The method of claim 3, wherein the one or more data verification tests comprise one or more data health checks to determine, for a received dataset comprising rows and columns of data items, a number of data items in the rows and/or columns determined as unhealthy based on health check criteria in the core ontology, the indication of the erroneous data being based on the number of unhealthy data items in one or more rows and/or columns.

7. The method of claim 1, wherein the ontology application is configured, responsive to detecting one or more constraints not being met, to run one or more fixing algorithms automatically to fix non-compliant data items of the dataset, and to fix at least one non-complying data item in the non-complying dataset so that it complies with the core ontology.

8. The method of claim 1, wherein the ontology application is further configured to prevent non-compliant data from being propagated to one or more further dataset transformations.

9. The method of claim 1, wherein the ontology application is further configured to permit user-definition of a customized ontology and to permit data complying with the core ontology to be applied to the customized ontology, which the customized ontology defines constraints for one or more data objects not in the core ontology.

10. The method of claim 1, wherein the core ontology and ontology application is provided to a plurality of parties of the shared database in a single file.

11. The method of claim 1, further comprising receiving, via an application programming interface (API), an access request.

12. The method of claim 1, wherein the access controls are encapsulated within a policy object, the policy object comprising an identifier of an associated data resource corresponding to a data object, one or more parent identifiers of a parent data resource from which the data resource depends, and one or more dependent identifiers of a dependent data resource.

13. The method of claim 1, further comprising transmitting one or more data packets to a server hosting the ontology application, the one or more data packets indicative of access permissions.

14. The method of claim 1, wherein the shared database corresponds to a distributed set of storage nodes.

15. The method of claim 1, wherein the one or more datasets are noncombinable with the ontology application.

16. The method of claim 1, wherein the core ontology specifies an encoding of transformed objects.

17. A method, performed by one or more processors, the method being performed at a processing terminal which uses an ontology application and an associated core ontology for producing a plurality of data objects, the core ontology defining one or more data validation tests comprising constraints required to be met for producing, from one or more received datasets, one or more data objects for storing in a shared database, wherein the constraints comprise access control permissions of the one or more data objects, the access control permissions comprising read or write permissions corresponding to the one or more data objects, the method comprising:

receiving one or more datasets for sending to a shared database, wherein the one or more datasets represent one or more data objects;

receiving an indication to expand the core ontology, wherein the expanding of the core ontology comprises adding a previously invalidated data object to the expanded core ontology, wherein the previously invalidated data object comprises a data structure generated from one or more datasets, wherein the expanding of the core ontology comprises:

deriving a new data validation test that validates the previously invalidated data object;

validating the indication to expand the core ontology based on a number of prior requests of the previously excluded data object or of a data field corresponding to the previously excluded data object exceeding a threshold number; and in response to validating the indication:
implementing the new data validation test to:
determine if the received one or more datasets conform to the constraints of the expanded core ontology;

store the received one or more datasets as the one or more data objects in the shared database, conditional on the constraints being met; and in response to determining that a portion of the received one or more datasets are associated with one or more unmet constraints, electronically generate a signal that halts a downstream process acting on any data derived from the portion of the received one or more datasets or modifying a signal that initiates the downstream process.

18. A computer program embedded in a non-transitory computer readable medium, which, when executed by one or more processors of a data processing apparatus cause the data processing apparatus to carry out a method according to any preceding claim.

* * * * *